(12) United States Patent
Hartenstein (10) Patent No.: US 11,027,641 B2
(45) Date of Patent: Jun. 8, 2021

(54) FRONT GRILL WITH LED MODULE LIGHTING SYSTEM

(71) Applicant: AAC Enterprises LLC, Metairie, LA (US)

(72) Inventor: Justin Hartenstein, Metairie, LA (US)

(73) Assignee: AAC Enterprises LLC, Metairie, LA (US)

( * ) Notice: Subject to any disclaimer, the term of this patent is extended or adjusted under 35 U.S.C. 154(b) by 205 days.

(21) Appl. No.: 15/932,428

(22) Filed: Oct. 9, 2017

(65) Prior Publication Data

US 2019/0106047 A1 Apr. 11, 2019

(51) Int. Cl.
| | |
|---|---|
| *B60Q 1/00* | (2006.01) |
| *B60Q 1/34* | (2006.01) |
| *B60Q 1/04* | (2006.01) |
| *F21V 29/503* | (2015.01) |
| *F21K 9/20* | (2016.01) |

(Continued)

(52) U.S. Cl.
CPC ......... *B60Q 1/0035* (2013.01); *B60Q 1/0441* (2013.01); *B60Q 1/34* (2013.01); *F21K 9/20* (2016.08); *F21K 9/69* (2016.08); *F21S 41/141* (2018.01); *F21S 41/143* (2018.01); *F21S 41/19* (2018.01); *F21S 43/14* (2018.01);

(Continued)

(58) Field of Classification Search
CPC ...... B60Q 1/0035; B60Q 1/34; B60Q 1/0441; B60Q 1/2661; F21S 41/141; F21S 43/14; F21S 41/19; F21S 41/192; F21S 41/194; F21S 41/196; F21S 41/198; F21S 43/19; F21S 43/195; F21Y 2115/10; F21V 29/503; F21V 29/70; B60R 19/52; B60R 19/525; B60R 19/527; B60R 2019/525; B60R 2019/527; B60R 2019/1886; F21K 9/20; F21K 9/69

See application file for complete search history.

(56) References Cited

U.S. PATENT DOCUMENTS

| | | | |
|---|---|---|---|
| 6,386,624 B1 * | 5/2002 | Schultz | B62D 25/084 180/68.4 |
| 8,684,450 B2 * | 4/2014 | Stedman | B62D 25/085 280/785 |

(Continued)

FOREIGN PATENT DOCUMENTS

| | | | | |
|---|---|---|---|---|
| DE | 10340723 A1 * | 4/2005 | ........... | B60Q 1/2661 |
| GB | 1243373 A * | 8/1971 | ............... | B60Q 1/11 |

OTHER PUBLICATIONS

"Cliffride Manual", edition printed Apr. 12, 2016 and accessed from https://www.quadratec.com/p/cliffride/holcolm-grill-led-light-bar-07-17-jeep-wrangler-jk on Jun. 12, 2019 (Year: 2016).*

(Continued)

*Primary Examiner* — Erin Kryukova
(74) *Attorney, Agent, or Firm* — Edwin A. Sisson, Attorney at Law, LLC; Jeffrey J. Banyas (57) ABSTRACT

Disclosed herein is a vehicle accessory grill comprising a plurality of edge protrusions, a front surface, a rear surface, a plurality of air apertures, and a plurality of lighting apertures. The grill also comprises a lighting system which may comprise a control module and a plurality of lamps. The plurality of lamps may include a plurality of high beam lamps, a plurality of low beam lamps, a plurality of daytime running lamps, and a plurality of turn lamps.

10 Claims, 11 Drawing Sheets

(51) Int. Cl.
*F21K 9/69* (2016.01)
*F21S 41/141* (2018.01)
*F21S 43/14* (2018.01)
*F21V 29/70* (2015.01)
*F21S 41/19* (2018.01)
*F21S 41/143* (2018.01)
*F21Y 115/10* (2016.01)
*B60R 19/52* (2006.01)

(52) U.S. Cl.
CPC ............ *F21V 29/503* (2015.01); *F21V 29/70* (2015.01); *B60R 2019/525* (2013.01); *F21Y 2115/10* (2016.08)

(56) References Cited

U.S. PATENT DOCUMENTS

| | | | | |
|---|---|---|---|---|
| 2004/0057242 | A1* | 3/2004 | Contarino | A61L 27/34 362/487 |
| 2004/0179368 | A1* | 9/2004 | Takeda | H05B 33/0845 362/466 |
| 2005/0094409 | A1* | 5/2005 | Elwell | B60Q 1/2661 362/496 |
| 2007/0216180 | A1* | 9/2007 | Hanson | B60Q 1/0035 296/1.08 |
| 2008/0308332 | A1* | 12/2008 | Gonzalez-Salvador | B62D 25/084 180/68.4 |
| 2009/0154188 | A1* | 6/2009 | Ito | G05D 23/1931 362/547 |
| 2009/0267364 | A1* | 10/2009 | Crainic | B60Q 1/0408 293/117 |
| 2010/0232174 | A1* | 9/2010 | Arakawa | B60Q 1/2661 362/547 |
| 2014/0175978 | A1* | 6/2014 | Kobayashi | B60Q 1/1423 315/82 |
| 2015/0228630 | A1* | 8/2015 | Eichenberg | H01L 25/0753 362/545 |
| 2017/0210321 | A1* | 7/2017 | Sanfilippo | B60R 19/52 |
| 2017/0327029 | A1* | 11/2017 | Tsumiyama | B60Q 1/0088 |
| 2018/0363873 | A1* | 12/2018 | Loaiza | B60Q 1/18 |
| 2019/0219243 | A1* | 7/2019 | Jun | F21S 43/237 |
| 2019/0291798 | A1* | 9/2019 | Ignarra | B60Q 1/34 |

OTHER PUBLICATIONS

"Rugged Ridge Spartan Grille System With Instructions", Quadratec website dated Sep. 2, 2016 accessed via Wayback Machine from https://www.quadratec.com/p/rugged-ridge/spartan-grille-system-quadratec-stealth-led-headlights-07-17-jeep-wrangler-jk on Jun. 12, 2019, instruction manual printed 2015 (Year: 2016).*

"Spartan Grille" Installation Manual, Omix-Ada, 2015.*

* cited by examiner

FRONT GRILL WITH LED MODULE LIGHTING SYSTEM

FIELD OF THE INVENTION

The present invention relates generally to an accessory for a vehicle, more particularly a grill that alters the output of lighting and the arrangements thereof.

BACKGROUND OF THE INVENTION

Presently, vehicles employ a standard factory prepared arrangement of lighting systems and grills conventionally known to the industry. This convention does however usually restrict the consumer regarding the operation of the headlight/low beams, high beams, daytime running lamps, and turn signals in a conventional fashion that is often cumbersome to replace, inspect, exchange, upgrade, or is outright unavailable to the conventional operation of the vehicle. The present invention would seek to surmount these conventions and shortcomings by providing a grill embedded with a unique lighting system that separates the lighting from the chassis of the vehicle by replacing the conventional grill thereof. The unique lighting system would enable the emplacement of lighting arrangements not conventionally seen on vehicles such as certain jeeps, and other automobiles through a plurality of lighting apertures that may permit modular assignment and removal of a complementing plurality of lamps for easy maintenance. Whereupon the activation of the plurality of lamps would be engaged through the conventional articulation of the vehicles lighting system and powered through the native power of the vehicle to produce a centralized grill-grounded platform as opposed to the chassis as convention holds. By using high-output LED clusters coupled with adequate heatsinks and lens optics to focus and direct the light; where the activation and usage of the lamps is facilitated by a control module through a plurality of cables, the weight of the apparatus may be diminished, thus ensuring the apparatus or the emplacement thereof does not deteriorate and disassociate from the vehicle at inopportune times as heavier conventional lamps would present. Further does the apparatus provide for a vehicular accessory that circumvents the industry convention with no deterioration in performance, and enhances options allotted to the user regarding vehicular illumination. By utilizing a control module, the present apparatus may go even farther to customize the display of the plurality of lamps and equally manage the consumption of power more directly and extend the options available to the driver.

DETAILED DESCRIPTION OF THE INVENTION

All illustrations of the drawings are for the purpose of describing selected versions of the present invention and are not intended to limit the scope of the present invention.

Figure 1:
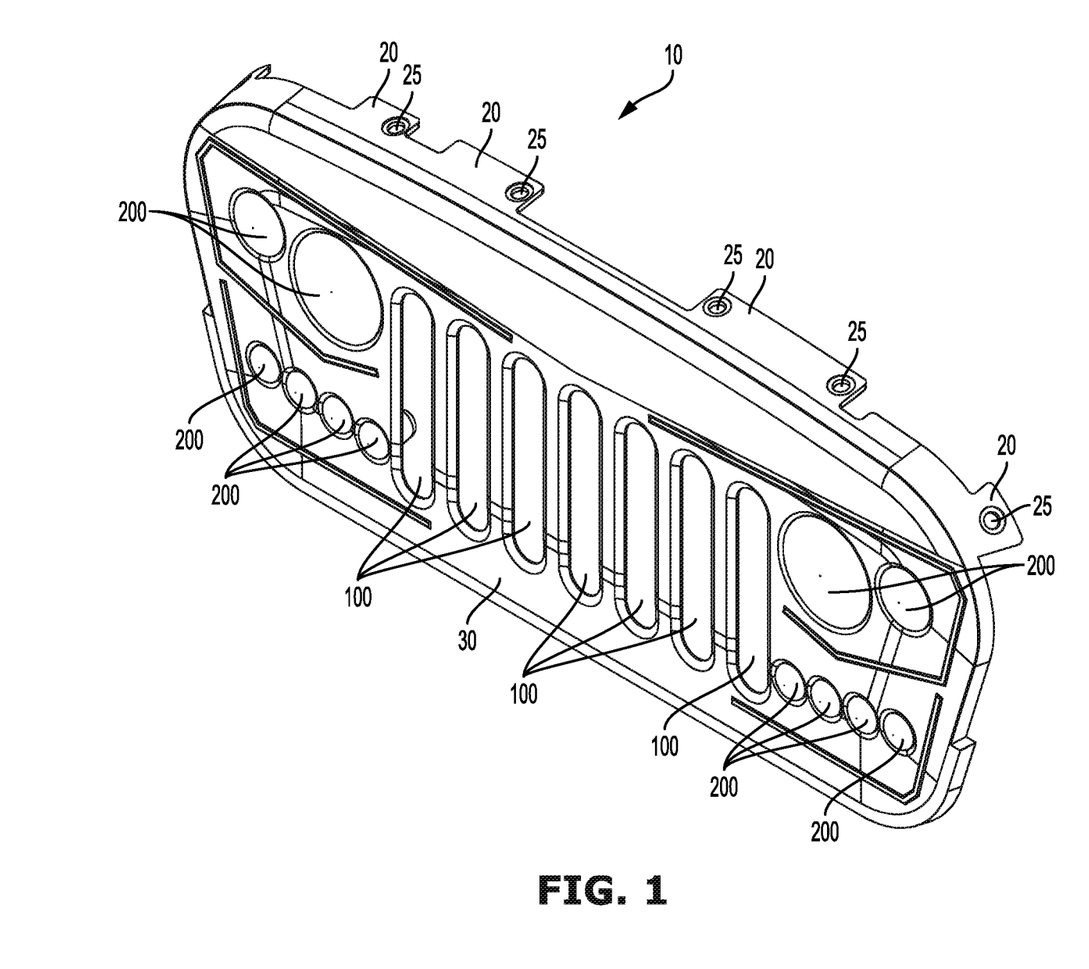
FIG. 1 is a perspective view of the assembly where the plurality of lighting apertures is observed in four distinct profiles including the linearized upper string corresponding to the plurality of daytime running lamps, the linearized lower string corresponding to the plurality of turn lamps, the largest curvilinear aperture adjacent to the nearest air aperture corresponding to the plurality of high beam lamps, and the lesser curvilinear apertures located both adjacent to and below the plurality of high beam lamps corresponding to the plurality of low beam lamps in a presented count of ten.
Figure 2:
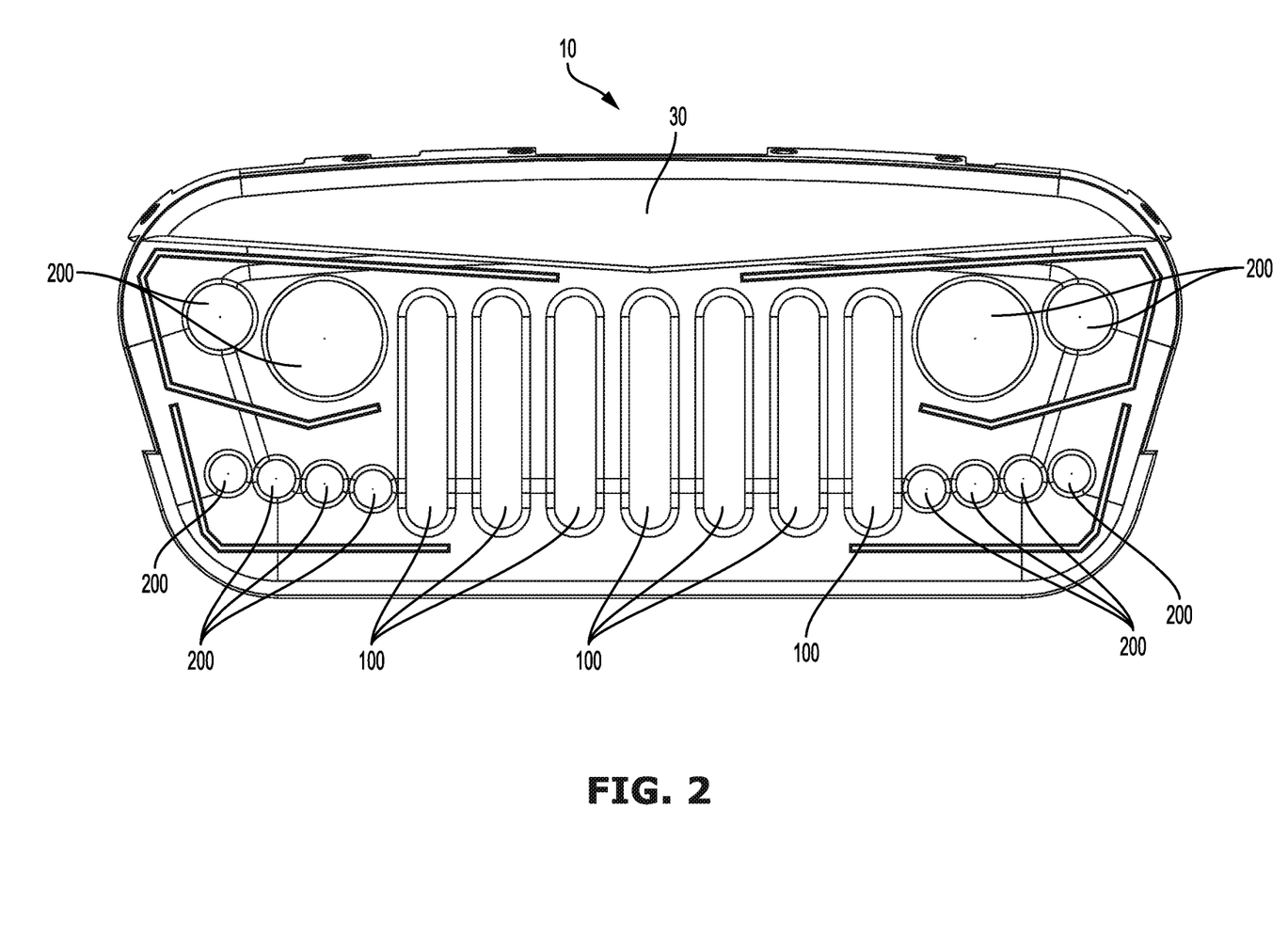
FIG. 2 is a front sectional view of the assembly thereof where the plurality of air apertures is observed centered horizontally with their longitudinal dimension near vertical in relation to the plurality of lamps and the distinctive 1' shape of the plurality of turn lamps is further observed.
Figure 3:
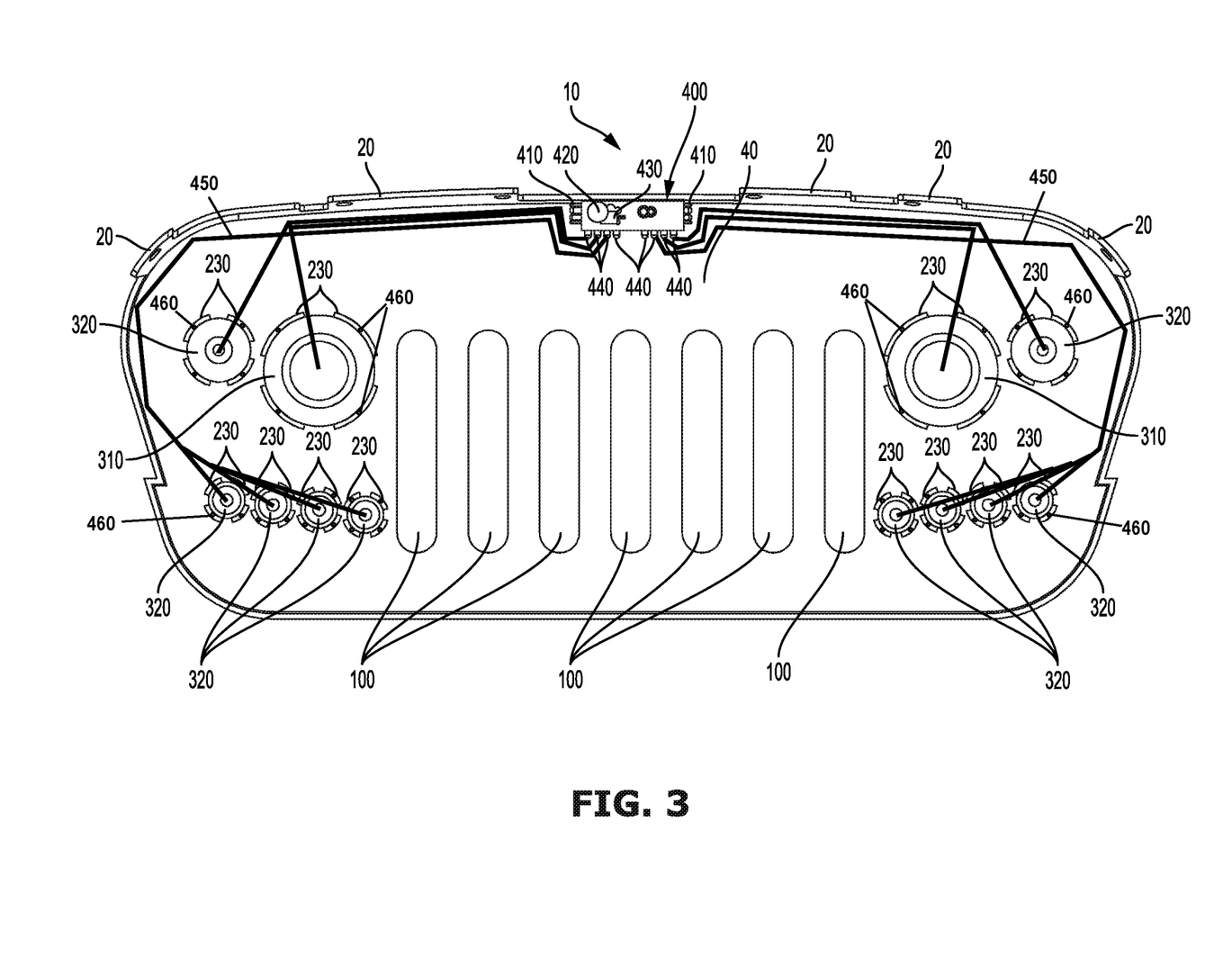
FIG. 3 is a rear sectional view of the assembly thereof where the plurality of fastening protrusions is observed around the curvilinear shaped plurality of lamps. Further observed is the control module on the rear surface and adjacent to the plurality of edge protrusions where the plurality of cables is observed extending from the edges thereof and the plurality of inlet ports are observed on the rear facing surface.
Figure 4:
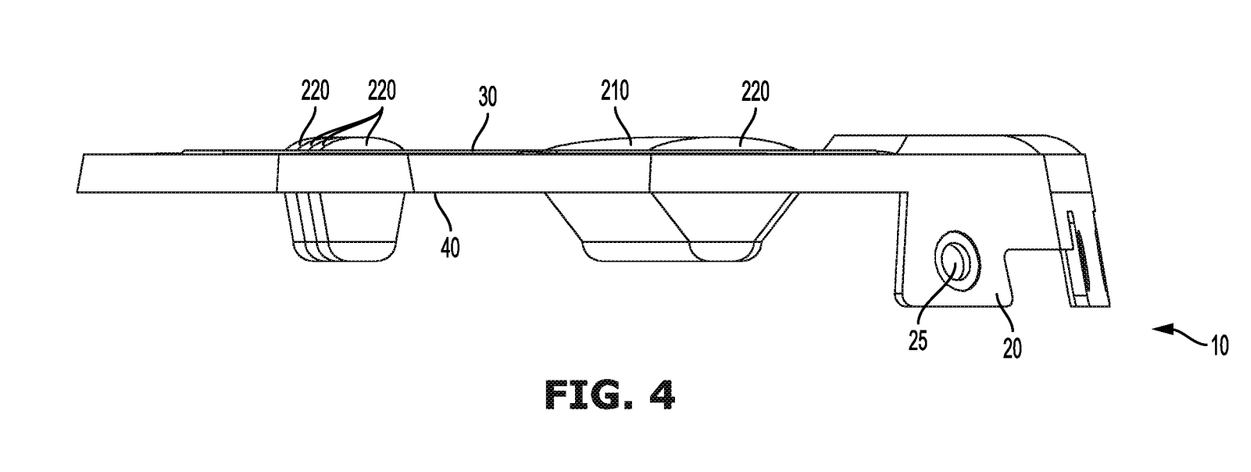
FIG. 4 is a right sectional view of the assembly thereof where the plurality of lamps is observed passing through the grill and the plurality of edge protrusions and fastening apertures are further observed.
Figure 5:
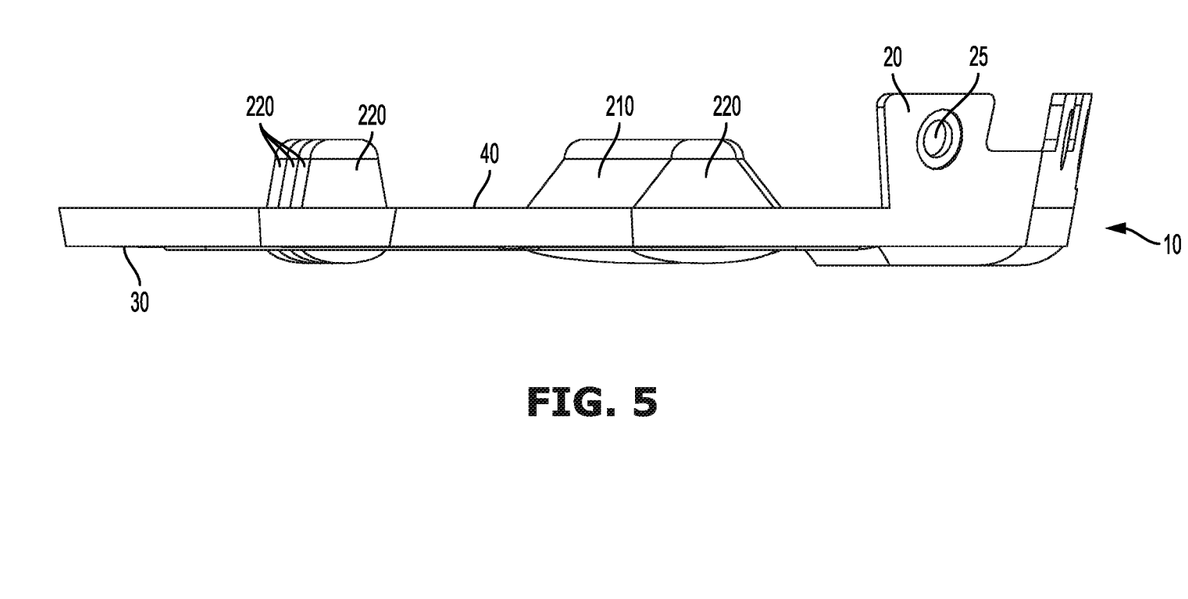
FIG. 5 is a left sectional view of the assembly thereof.
Figure 6:
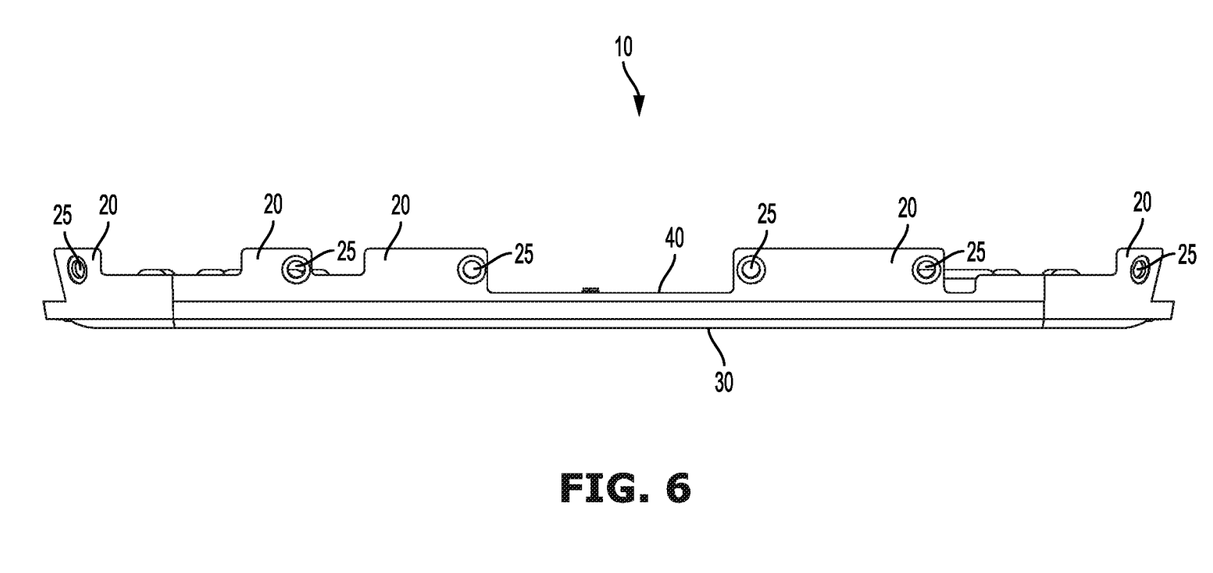
FIG. 6 is a top sectional view of the assembly thereof where the plurality of edge protrusions is fully observed alongside at least one fastening aperture located on each dominant protrusion.
Figure 7:
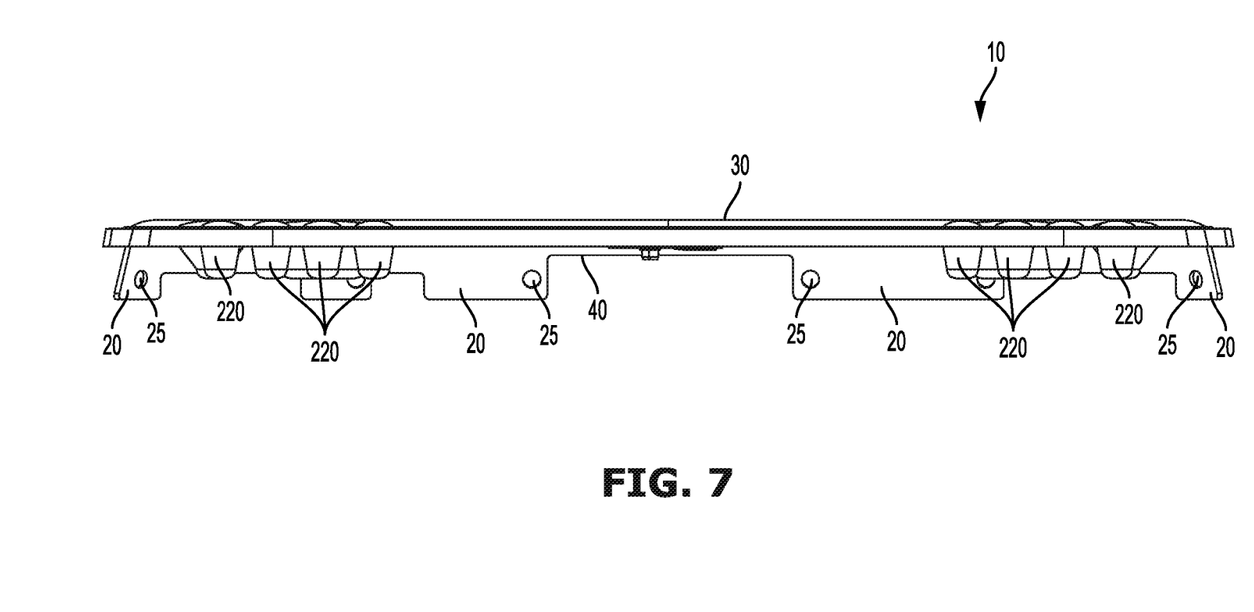
FIG. 7 is a bottom sectional view of the assembly thereof where the plurality of inlet ports is observed protruding from the rear surface of the control module.
Figure 8:
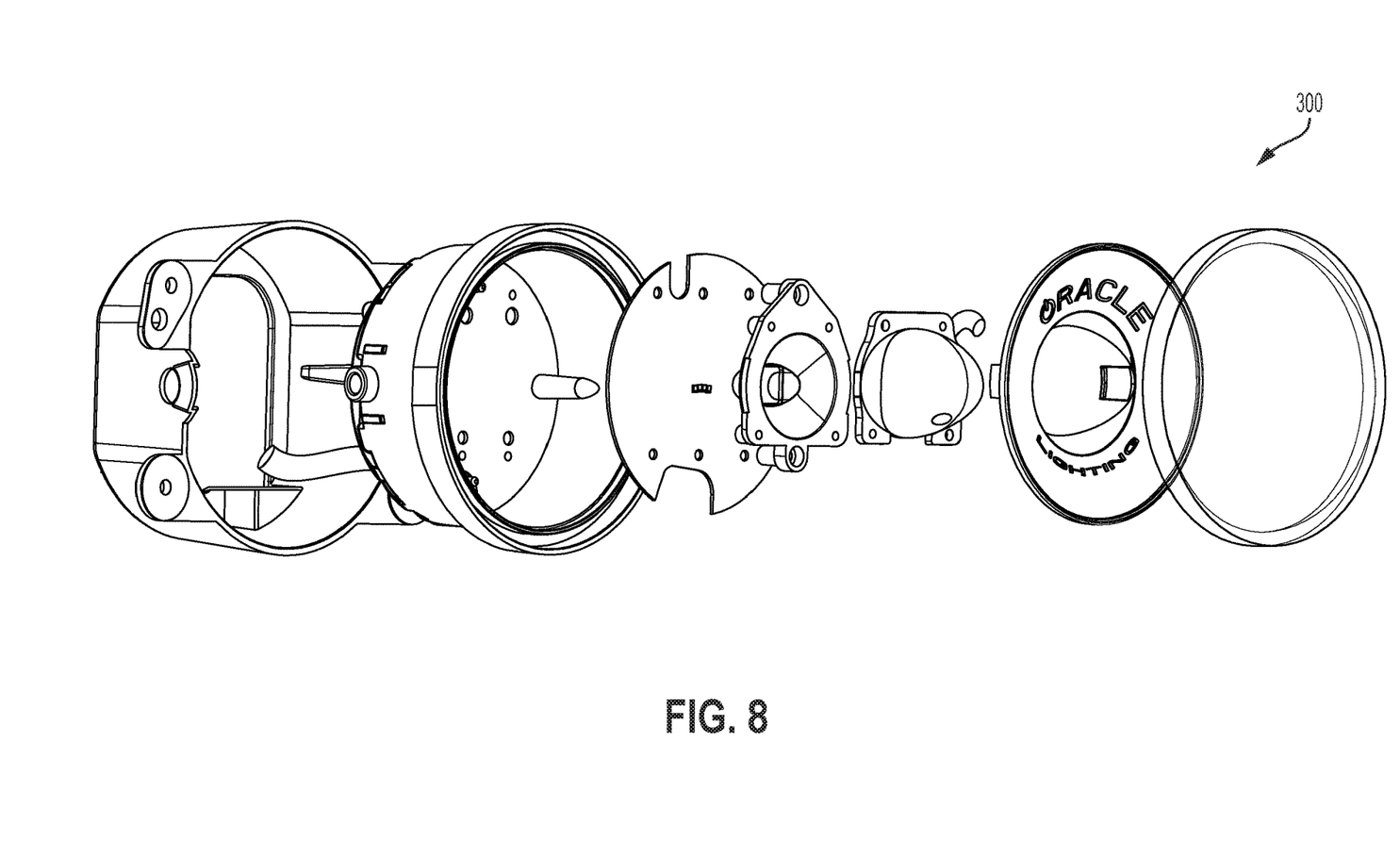
FIG. 8 is a depiction of a single high beam lamp where the lens optics are observed at the forefront, a light diffusing means thereafter, and the plate consisting of the plurality of LEDs in a preferable set of three where the aforementioned structures rest within the high beam casing recess where the casing itself further functions as a heatsink.
Figure 9:
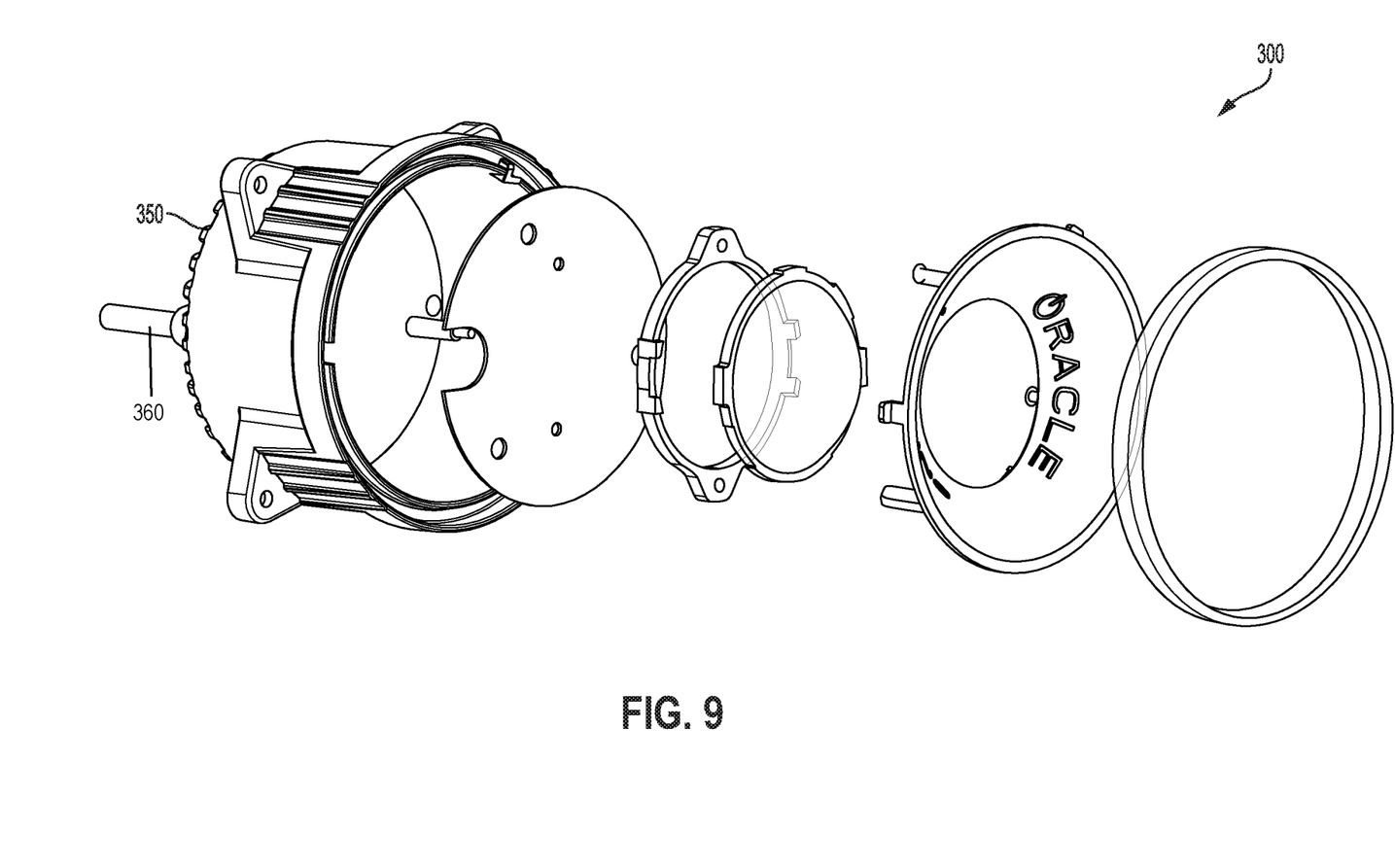
FIG. 9 is a depiction of a single driving beam lamp or headlamp where the plurality of fastening means' point of engagement with the plurality of fastening protrusions are made evident, and the substructure of the component is observed consisting of the lens optics comprising the cap and an amplification projector bezel, and the lamp thereafter where three LEDs are secured on the plate at the rear that rests within the high beam lamp casing that further functions as a heatsink. Further observed is the cable protruding from the rear of the headlamp casing.
Figure 10:
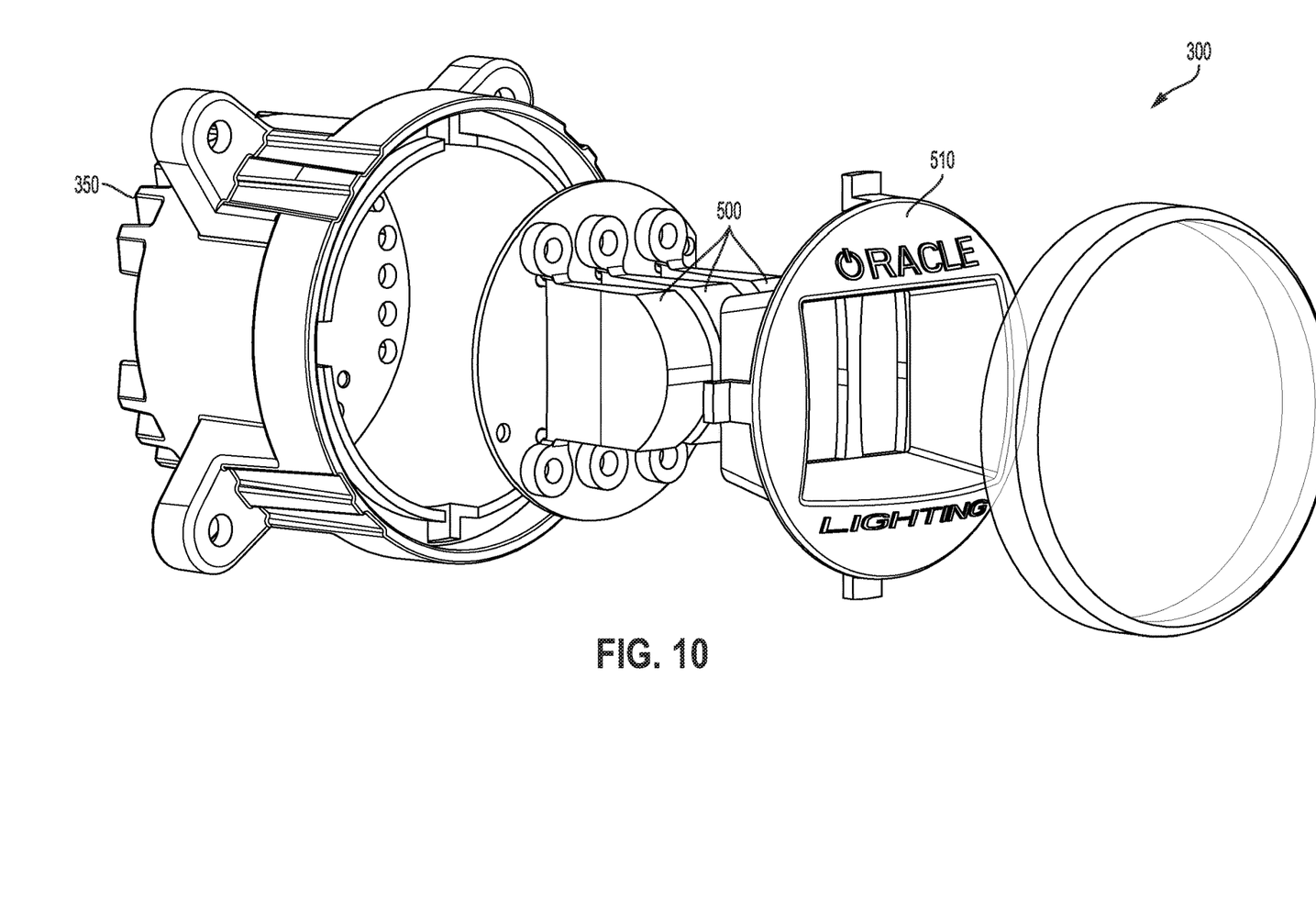
FIG. 10 is a depiction of a single low beam lamp where the lens optics are observed at the forefront, followed by the plurality of LED modules, composed of three, that is placed atop the rear most plate where the aforementioned further is to be situated within the low beam casing recess that may function as a heatsink. Further observed is the plurality of fastening points that would secure the lamp into the grill.
Figure 11:
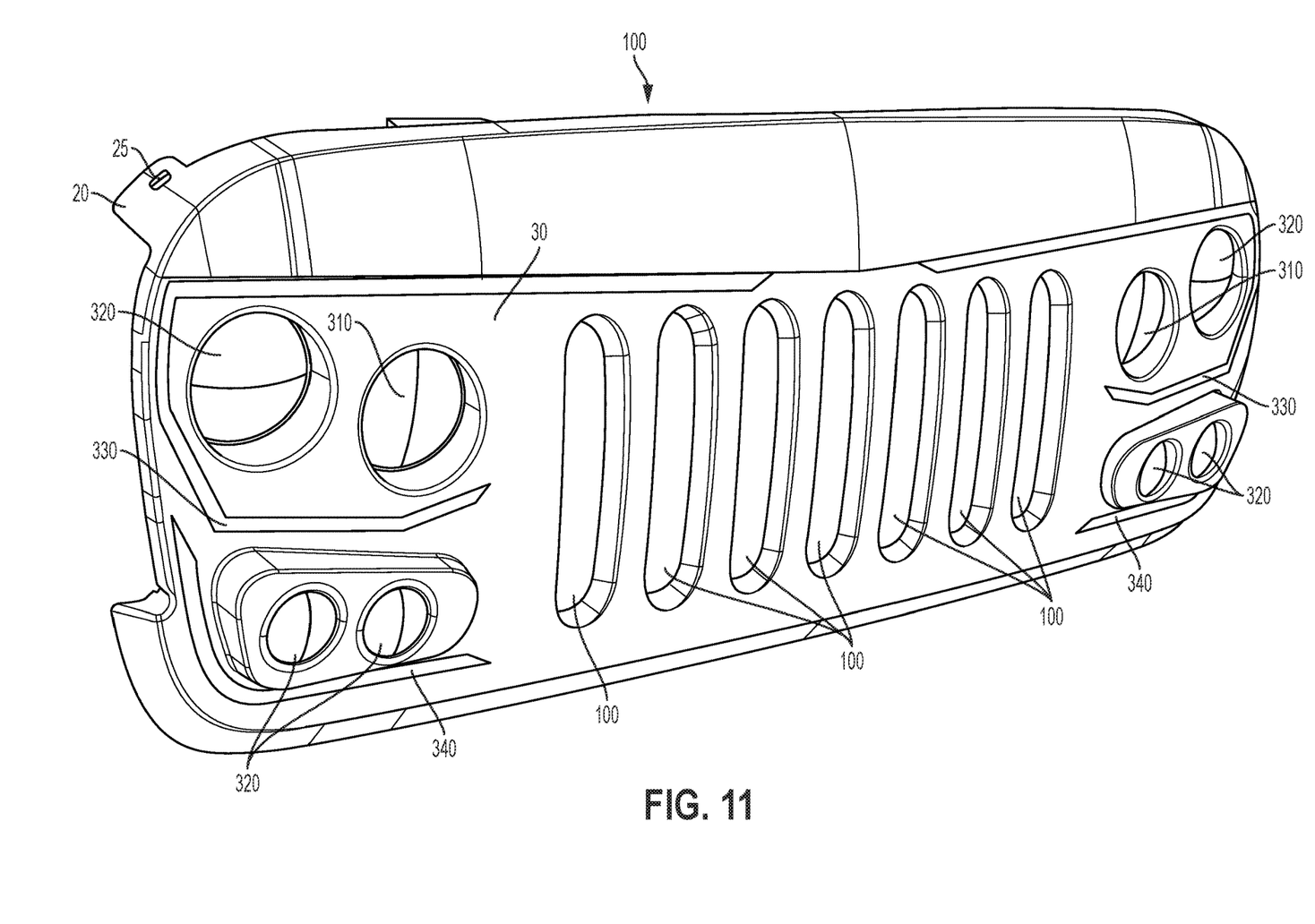
FIG. 11 is a depiction of the grill in a preferred design where the bottommost plurality of low beam lamps is protruded from the front tangent surface of the grill along a plateau formation.

In reference to FIGS. 1-11, the present invention is generally a vehicle accessory embodied into a grill that replaces the conventional, standard grill and accentuates it with a lighting system. Where the grill comprises a plurality of edge protrusions (20), a front surface (30), a rear surface (40), and a plurality of air apertures (100). The plurality of edge protrusions further comprises at least one fastening aperture (25). The front surface further comprises a plurality of lighting apertures (200) that themselves further still comprise a plurality of lighting fastener means (460). The rear surface further comprises a plurality of fastening protrusions (230), a plurality of control fasteners (410), and an optional plurality of channels. The lighting system comprises a control module (400), and a plurality of lamps. The control module further comprises a processor (420), a voltage regulator (430), a plurality of inlet ports (440), and a plurality of cables (450). While the plurality of lamps further comprises a plurality of high beam lamps (210/310), a plurality of low beam lamps (220/320), a plurality of daytime running lamps (330), and a plurality of turn lamps (340).

The grill is preferably near-rectilinear in geometry with a planar or thin sheet composition that may be outfitted in place of a vehicle's conventional grill. The grill would form the basal platform for affixing the lighting system throughout and would be secured to the vehicle through the plurality of edge protrusions and the proceeding at least one fastening aperture. The grill would further preferably possess a plurality of channels that either embed through the cross section of the grill, or elsewise a plurality of fastening rungs or brackets to direct and secure the plurality of cables to the grill.

Located along the top rear-facing edges of the grill and the lip thereof is the plurality of edge protrusions that extend outward a sufficient distance to enable at least one fastening aperture to engage with the conventional fastening bolts of the vehicle. The plurality of edge protrusions would further preferably be in unity with the planar body of the grill, though disparate materials and fastening means may be explored in more complex embodiments. Bored along the major surface of an individual edge protrusion is at least one fastening aperture that is preferably curvilinear in geometry. The at least one fastening aperture would engage the established extraneous fasteners already present on the vehicle when replacing the conventional grill thereof.

Preferably convex and possessing a number of recesses is the front surface that is more prominently displayed when augmented to the vehicle. The front surface would be opposite the rear surface and adjacent to the plurality of edge protrusions. Formed along the front surface of the grill in select clusters is the plurality of lighting apertures where the topmost corner located linearized recesses may engage with the plurality of daytime running lamps and the bottommost corner-located linearized recesses would engage with the turn signals. The curvilinear apertures would be separated into at least two separate designations where the largest curvilinear aperture would be located nearest the top of the grill and adjacent to the plurality of air apertures, engaging with the plurality of high beam lamps. The lesser curvilinear lighting apertures would be located both horizontally adjacent to the larger curvilinear lighting aperture and along the bottom edge of the grill in a linearized arrangement, consisting of a count of at least two where the lesser curvilinear apertures would engage with the plurality of low beam lamps. Formed of preferably two separate means is the plurality of lighting fastener means where the first would consist of an adhesive or conventional fastener engaging the plurality of turn lamps and the plurality of daytime running lamps in connection to the corresponding linearized plurality of lighting apertures. The second would preferably consist of means such as snap fits or conventional fasteners that secure the plurality of fastening protrusions with the plurality of high beam lamps and the plurality of low beam lamps and driving beam lamps through the plurality of lamp fastening apertures on the lamp casings observed in FIG. 8-10. Other means of fastening may be employed however including but not limited to: self-locating geometry, magnetics, snaps, and so on.

Opposite the front surface is the rear surface that houses the plurality of lamps consistent with a curvilinear geometry. The rear surface would preferably be planar and parallel with the front surface and bordered by the edges and the plurality of edge protrusions. Protruding from the rear surface of the grill and formed around the perimeter of the plurality of lighting apertures is the plurality of fastening protrusions that would engage the plurality of high beams and the plurality of low beams through the second variant of the plurality of lighting fastening means. The plurality of fastening protrusions may be possessed of a separate protrusion such as for a snap fit, an aperture correspondent to a conventional fastener or bolt, and other means of fastening that complement the plurality of lighting fastener means. Located preferably nearest the top center of the rear surface and adjacent to the plurality of edge protrusions is the plurality of control fasteners that would secure the control module to the grill. The plurality of control fasteners may further embody tie downs clips, brackets and the like that secure the plurality of cables spanning between the control module and the plurality of lamps.

Optionally, a plurality of channels may be formed between the front surface and the rear surface, formed in the cross section of the grill where both ends of the channel would open to the rear surface. The plurality of channels would be composed of an equal count and engaged by the plurality of cables to supply power securely between the control module and the plurality of lamps.

Formed at the vertical and horizontal centers of the grill is the plurality of air apertures that would preferably be in a count of seven. The plurality of air apertures would permit the passage of air and fluids conventional to the operation and convection of the vehicle's engine and cavity space under the hood as well as the air inlets of the vehicle. The plurality of air apertures would further preferably be formed of an ovular or curvilinear geometry conventional to vehicles where the longitudinal dimension of each aperture is parallel to the adjacent air apertures and spaced equidistant to one another between the plurality of lamps and to a vertical height less than the upper linearized aperture of the plurality of daytime running lamps and above the lower linearized apertures correspondent to the plurality of turn lamps.

The lighting system would be integrated into and engage with the grill through the plurality of lighting apertures. The lighting system would further be secured to the rear surface of the grill through the plurality of control fasteners in relation to the control module and optionally routing any of the plurality of cables through the optional plurality of channels to the plurality of lamps. With regard to the plurality of low beam lamps and the plurality of high beam lamps, the plurality of the individual curvilinear lamps would use a similar universal construction for the individual bulbs, preferably through the use of a plurality of high-output LEDs that are clustered into three pairs of LEDs linearly arranged in a horizontal orientation. A count of six LEDs would preferably be designated to each individual lamp of the plurality of high beam lamps and the plurality of low beam lamps where enhancing lens optics would redirect and focus the light of the latter with deference to the Department of Transportation standards. The plurality of lamps in the lighting system would further be possessed of at least one heat sink (350) that absorbs the surplus of heat from the plurality of lamps, whereupon the heat sink is exposed to the convection current running through the plurality of air apertures when the vehicle is in motion. The heat sink itself would be preferably composed of the entire casing that houses the plurality of lamps sub components as observed in FIG. 8-10.

Communicating between the extraneous battery of the vehicle and the extraneous computer or native processor of the vehicle is the control module. The control module would be capable of interpreting the conventional signals of the vehicle corresponding to the turn signals, daytime running lamps, high beams, and low beams through a processor where the power to operate the corresponding plurality of turn lamps, plurality of daytime running lamps, plurality of high beam lamps, and the plurality of low beam lamps would be supplied from the extraneous battery of the vehicle through a voltage regulator. The control module would further interpret where less power is called upon from the plurality of lamps and cease the supply of power from the battery.

Located in the control module is a processor of nondescript capacity but would, at a minimum, be required to interpret the signals of the native vehicle correspondent to the operation of the lights and further able to measure the input voltage or current to the requisite output voltage needed of the plurality of lamps and deciding whether to cut off the supply of power from the native battery of the vehicle if a threshold is not met. Further, the processor would be capable of actuating the operation of the plurality of turn lamps and optionally the plurality of daytime running lamps through a sequencer that initiates and indicated the startup of the signal and may persist indefinitely, for a non-descript span of time, and other performances or display routines. In connection to the processor and facilitating the flow of electricity from the battery of the vehicle is the voltage regulator. The voltage regulator would be capable of altering and limiting the flow of electricity to the individual lamps in the plurality of lamps based on power demand and need with a means of measuring the difference in the supply and demand of electricity, relaying the measure thereof to the processor to determine how much electricity should be permitted to engage the lighting system. The voltage regulator may be a composite that can handle multiple inputs or consist of a plurality of regulators discretized to the individual plurality of lamps, and is understood to be capable of regulating voltage or current as requisite.

Located preferable on the rear of the control module and in connection to the processor and voltage regulator is the plurality of inlet ports that accept the signals from the vehicle's native computer system and the power supply of the vehicle's battery. The plurality of inlet ports would preferably be connected thereto through several cables consistent with the plurality of cables and secured to the requisite supply points of power or information. In connection between the plurality of lamps, the control module, the battery of the vehicle, the computer of the vehicle, and optionally the plurality of channels is the plurality of cables that convey power and information or signals through the system as dictated and supplied by the vehicle. The plurality of cables may optionally engage through the plurality of channels embedded within the grill to more amply secure the cables thereof when in connection between the control module and the plurality of lamps at a point of fastening through plugs, jacks, conventional fasteners, snap fits, and so on.

Located throughout the grill in at least four disparate forms and geometries is the plurality of lamps. The plurality of lamps would preferably comprise a plurality of LEDs therein that are six in count, in a cluster of three horizontally arranged pairs that are wired in parallel (500) and accentuated through a lens (510) optic that produces a focus and redirection of light for the low beam lamps and an amplification of the high beam lamps. The plurality of lamps would further possess at least one heat sink on the rear exposed surface to mitigate the propagation and buildup of heat in the high-output LEDs. The plurality of lamps would further be preferably sealed and waterproofed to mitigate oncoming precipitation damage and embedded under a domed or convex cover that further accentuates the illumination produced therefrom.

Preferably two in count and corresponding and engaging with the two largest curvilinear lighting apertures of the plurality of lighting apertures is the plurality of high beam lamps. The plurality of high beam lamps would be connected to the control module through the plurality of cables and secured in the individual aperture through the plurality of fastener protrusions and plurality of light fastening means. The plurality of high beams would be activated when it is registered by the control module that the user has engaged the native high beam function of the vehicle and would further not be required to redirect or offset the angle of light produced, whereupon the apparatus would produce a center weighted distribution of light from the grill.

Complementing the plurality of high beam lamps and using the smaller plurality of curvilinear lighting apertures is the plurality of low beam lamps. The plurality of low beam lamps preferably comprises a count of at least four lamps evenly distributed on either side of the grill where a requisite first pair would be adjacent horizontally to the plurality of high beam lamps near the upper corners of the grill, and at least two on both sides in a near horizontal linear arrangement below the first pair of low beam lamps and the pair of high beam lamps. The upper, corner located plurality of low beam lamps may also be classified as a plurality of driving beam lamps or headlamps that are the general standard luminosity for nighttime driving. The plurality of low beam lamps would be connected to the control module through the plurality of cables and would respond to signals dictated by the processor when notified that the low beams, or headlights of the vehicle are engaged. The plurality of low beam lamps would be required to produce a diffusion of light or a reangle thereof that reduces the glare directed at oncoming traffic and would utilize lens optics to achieve such.

Formed into two linear strings of LEDs that are embedded into an acrylic or transparent shell is the plurality of daytime running lamps. The plurality of daytime running lamps would engage the upper corner-located linearized recesses correspondent to the plurality of lighting apertures, whereupon the individual daytime running lamps would circumscribe three sides of the top curvilinear lighting apertures along the top, bottom, and a single side, where the bottom string would be above the linear plurality of low beam lamps. The plurality of daytime running lamps would be expected to be in operation for so long as the vehicle is in operation, elsewise when dictated to by the processor through the plurality of cables.

Comparable in construction and material to the plurality of daytime running lamps is the plurality of turn lamps that are similarly linearized and engaged to the lower linearized recesses of the plurality of lighting apertures. The plurality of turn lamps would be in connection to the processor through the plurality of cables on either side and would form a loosely shape 1' that extends beneath the lower plurality of low beam lamps and preferably just beneath the nearest air aperture. The plurality of turn lamps would preferably be outfitted to respond to a sequencer or comparable algorithm that produces an articulate display or performance of LEDs, preferably in a linearly sequenced fashion when the turn signal of the vehicle is engaged and correspondent in either direction.

Although the invention has been explained in relation to its preferred embodiment, it is to be understood that many other possible modifications and variations can be made without departing from the spirit and scope of the invention.

The invention claimed is:

1. A vehicle accessory grill comprising:
 a front surface,
 a rear surface,
 a plurality of air apertures originating at the front surface and passing through the rear surface, and
 a plurality of lighting apertures originating at the front surface and passing uninterrupted through the rear surface, wherein at least one lamp of a total plurality of lamps is located at least partially within each lighting aperture, wherein the at least one lamp is directly attached to the rear surface of the vehicle accessory grill by at least one lighting fastener means wherein the total plurality of lamps includes at least one high beam lamp, at least one low beam lamp, at least one daytime running lamp, and at least one turn lamp, wherein the total plurality of lamps forms at least a portion of a lighting system, the lighting system further comprises a control module for controlling the total plurality of lamps, the control module being secured to a rear surface of the vehicle accessory grill by a plurality of control fasteners.

2. The vehicle accessory grill of claim 1, further comprising a plurality of edge protrusions.

3. The vehicle accessory grill of claim 2, wherein at least one of the plurality of edge protrusions comprises at least one fastening aperture.

4. The vehicle accessory grill of claim 1, wherein the rear surface comprises a plurality of fastening protrusions.

5. The vehicle accessory grill of claim 4, wherein the rear surface comprises the plurality of control fasteners.

6. The vehicle accessory grill of claim 1, wherein the rear surface comprises the plurality of control fasteners.

7. The vehicle accessory grill of claim 1, wherein the control module comprises a processor, a voltage regulator, a plurality of inlet ports, and a plurality of cables.

8. The vehicle accessory grill of claim 7, wherein the processor is configured to operate at least one of the at least one daytime running lamp and/or the at least one turn lamp through a sequencer configured to initiate at least one performance or display routine performed by the at least one daytime running lamp and/or the at least one turn lamp.

9. The vehicle accessory grill of claim 1, wherein at least one of the total plurality of lamps contains at least one heat sink.

10. The vehicle accessory grill of claim 1, wherein each of the total plurality of lamps contains at least one heat sink.

* * * * *